United States Patent [19]

Eden

[11] Patent Number: 4,547,966
[45] Date of Patent: Oct. 22, 1985

[54] SPRINKLER HEAD TRIMMER AND CLEANER

[76] Inventor: Brian W. Eden, 1404 Taft, Escondido, Calif. 92026

[21] Appl. No.: 639,461

[22] Filed: Aug. 10, 1984

[51] Int. Cl.⁴ ........................................... B26B 27/00
[52] U.S. Cl. ...................................... 30/300; 30/500; 30/DIG. 7; 15/180
[58] Field of Search ........... 30/300, 301, 310, DIG. 7, 30/500; 15/230, 198, 180, 111; 83/101

[56] References Cited

U.S. PATENT DOCUMENTS

| | | | |
|---|---|---|---|
| 2,809,864 | 10/1957 | Carr | 30/301 X |
| 3,118,162 | 1/1964 | Karr | 15/180 |
| 3,143,176 | 8/1964 | Drane, Jr. | 172/13 |
| 3,398,422 | 8/1968 | Barry | 15/180 |
| 3,555,680 | 1/1971 | Ford | 30/276 |
| 3,747,213 | 7/1973 | Green et al. | 30/279 |
| 3,905,103 | 9/1975 | Ford et al. | 30/276 |
| 3,923,102 | 12/1975 | Morris | 172/13 |
| 3,938,249 | 2/1976 | Chacon | 30/300 |
| 4,022,283 | 5/1977 | Morgan | 172/15 |

Primary Examiner—Jimmy C. Peters
Attorney, Agent, or Firm—Baker, Maxham, Callan & Jester

[57] ABSTRACT

A generally cup shaped cutting head for fitting over and around the sprinker head includes a generally circular cutting edge for cutting around a sprinkler head, and a cleaning brush mounted concentrically within the cutting head and recessed from the cutting edge for engaging and cleaning the surface of a sprinkler head, with the cutting head detachably mounted on the end of an elongated drive shaft which is adapted to be driven by an electric drill motor or the like.

12 Claims, 3 Drawing Figures

SPRINKLER HEAD TRIMMER AND CLEANER

BACKGROUND OF THE INVENTION

The present invention relates to lawn trimming devices and pertain particularly to an improved device for trimming around and cleaning sprinkler heads.

It is current practice in lawn areas to provide a sprinkling system that has a plurality of sprinkling heads that are recessed in or below the surface of the earth to permit clearance for mowers and the like. Such sprinkler heads however must be frequently cleared of grass growth to function properly. The sprinkler heads must also be kept clean and free of dirt and debris in order to function properly. Sprinkler heads frequently become clogged from mineral precipitation which clog the orifice of the sprinkler unit.

Many devices have been proposed in the past for trimming grass and weeds from around the sprinkler heads. These however while satisfactory for that purpose, do not provide means for cleaning the sprinkler heads.

It is accordingly desirable that some means be available which will simultaneously trim around a sprinkler head and simultaneously clean the sprinkler head of debris.

SUMMARY AND OBJECT OF THE INVENTION

It is the primary object of the present invention to provide improved trimming and cleaning device for sprinkler heads.

In accordance with the primary aspect of the present invention, a sprinkler head trimming and cleaning device includes an annular cutting blade for trimming around a sprinkler head and a centrally disposed cleaning brush for simultaneously cleaning the sprinkler head while trimming is being carried out.

BRIEF DESCRIPTION OF THE DRAWINGS

The objects and other objects and advantages of the present invention will become apparent from the following description when read in conjunction with the drawings wherein.

DETAILED DESCRIPTION OF A PREFERRED EMBODIMENT

Figure 1:
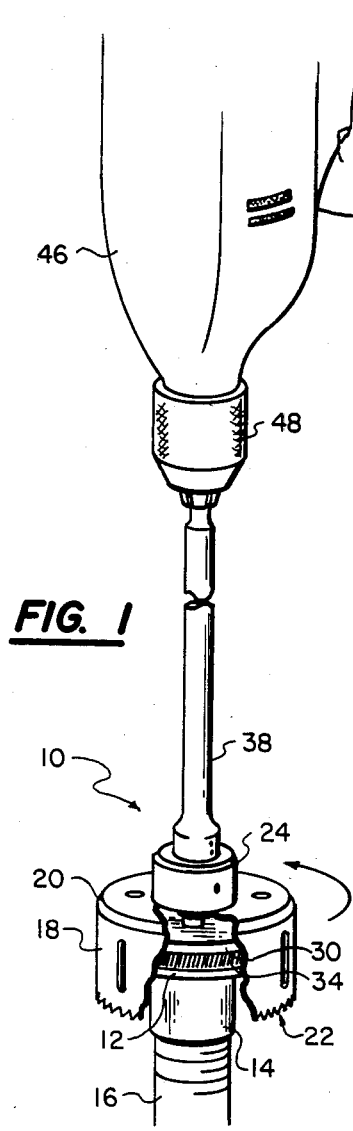
FIG. 1 is a perspective view showing a preferred embodiment of the invention in use.
Figure 2:
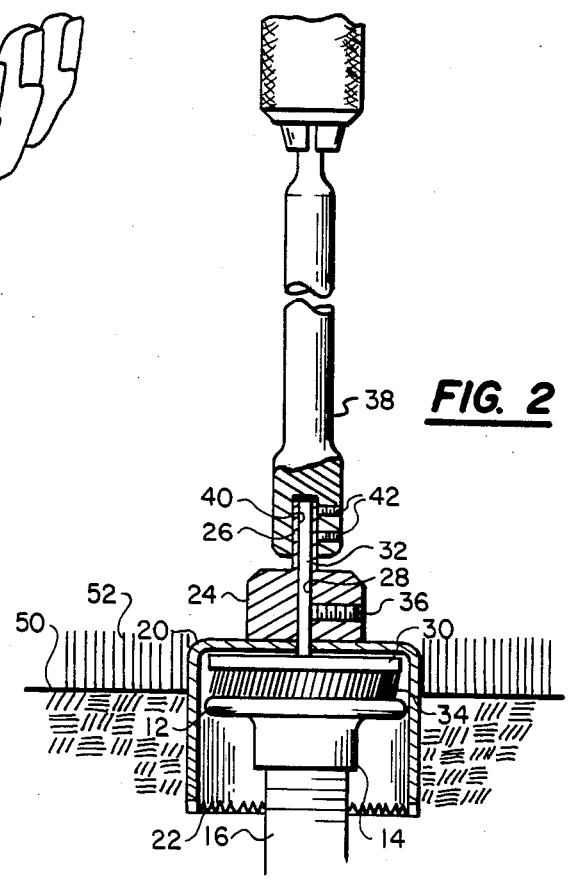
FIG. 2 is a side elevation view in section of the embodiment of FIG. 1.
Figure 3:
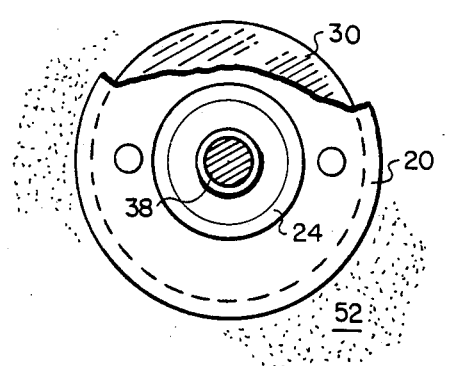
FIG. 3 is a view taken generally on line 3—3 of FIG. 2.

Referring to FIG. 1, a device designated generally by the number 10 in accordance with the present invention is shown in use trimming around and simultaneously cleaning a typical lawn sprinkler head. The present invention is designed to be used primarily with the typical lawn type sprinkler head which is typically recessed below the ground surface for grassy lawn such that the grass can be cut without interference from or damage to the sprinkler heads. The typical law sprinkler head as shown in FIGS. 1 and 2 comprises a generally flat disk like head 12 with a downwardly extending pipe connector 14 for connection to a riser 16. The riser 16 is connected to a source of water and delivers it to the sprinkler head which may be in one of two embodiments. These embodiments include a fixed head, and a pop-up head disposed in the center of the disk like top 12 with an adjustable orifice which dispenses water out in a fan or conical pattern through an angled slit.

The device of the present invention comprises a generally cylindrical cup like cutting or trimming head 18 having a generally flat circular bottom 20 with the cylindrical axially extending side walls terminating with a cutting edge 22 that is in the form of serrations or saw teeth. These are preferably sharpened to form a cutting edge such that rotation of the device engages and cuts grass, weeds and other growth around the sprinkler head. The cutting head 18 is preferably just slightly larger in diameter than the disk of the sprinkler head such that it fits fairly closely over the sprinkler head as shown in FIG. 2 thereby utilizing the sprinkler head as guide means for the cutting head.

The cutting head is mounted coaxially of a drive shaft which includes a clamp body or member 24 and a hollow extension shaft 26 both of which include a bore 28 which extends from inside the cutting head 18. The bore 28 extends coaxially of the cutting head and the drive shaft portions 24 and 26.

Mounted in and recessed within the cutting head is a cleaning brush comprising a disk 30 coaxially mounted on the end of a shaft 32 and including a plurality of axially extending bristles 34. The bristles 34 are preferably fine, stiff wire bristles extending straight out from the face of the disk support member 30. The bristles are preferably a fine wire such as a stiff steel spring wire. The shaft 32 extends along the bore 28 and is clamped in position within the clamp member 24 by a screw or the like 36. The bristles of the brush are preferably recessed within the cup like cutting head member below the cutting edge 22 permitting the cutting blade to extend downwardly beyond the top of the sprinkler unit a distance of on the order of from one to two inches.

An extension drive shaft 38 is connected at the lower end to the shaft extension 26 by a socket formed by a bore 40 with one or more set screws 42 engaging the shaft 26 for retaining and providing a drive coupling between the respective shafts.

A suitable drive motor such as an electric drill motor 44 may be utilized for driving or powering the cutting and cleaning unit. The upper end of the shaft 38 extends into and is gripped in a chuck 48 of a drill motor 46. Any form of driving unit or drill motor may be utilized such as cordless drill motor or the like.

In the typical installation, the sprinkler head 12 lies slightly below ground surface level 50 with a growth of grass 52 extending upwardly surrounding the sprinkler head. Typical grass such as that used for lawns quickly grow over and interferes with the sprinkler head spray pattern.

In operation, the cleaning and polishing unit is selected and connected to a suitable power unit and then placed over the sprinkler head with the cutting edge 22 of the cutting head engaging a grass or other growth or debris overlying the area slightly outside the sprinkler head. As the power is turned on, the spinning cutting head cuts and severs the grass and other growth surrounding the sprinkler head 12 as the cutting head 18 is forced downward over the sprinkler head such that the bristles 34 of the brush engage the upper surface of the sprinkler head. The bristles of the brush also serve as a stop limiting the depth of cut around the sprinkler head. This can be adjusted either by the length of the bristles or by the depth of the cutting head walls. As the bristles 34 engage the upper surface of the sprinkler head, they clean and polish the surface of the head removing dirt, mud, and accumulations of debris and precipitates. The bristles will also engage and clean the sprinkler orifice and in most instances will remove most material including said, gravel or other debris that may be clogging the sprinkler orifice.

Thus, while I have illustrated and described my invention by means of a specific embodiment, it is to be understood that numerous changes and modifications may be made therein without departing from the spirit and scope of the invention as defined in the appended claims.

I claim:

1. A combination sprinkler head trimmer and cleaner, comprising:
an elongated drive shaft;
generally cylindrical cup shaped cutting head having an axially directed circular cutting edge mounted coaxially on the end of said drive shaft for positioning around a sprinkler head; and
a brush mounted concentrically of said cutting head and recessed from said cutting edge for engaging and cleaning a sprinkler head.

2. The combination of claim 1 wherein said cutting edge is serrated for defining cutting teeth.

3. The combination of claim 1 wherein said brush is a wire bristle brush having bristles extending generally axially thereof.

4. The combination of claim 1 wherein said brush is detachably mounted within said cutter.

5. The combination of claim 1 wherein: said cutting head is detachaby mounted on the end of said elongated drive shaft.

6. The combination of claim 5 further comprising power means for rotating said shaft.

7. The combination of claim 2 wherein said brush is a wire bristle brush having bristles extending generally axially thereof.

8. The combination of claim 7 wherein said brush is detachably mounted within said cutter.

9. The combination of claim 8 wherein said cutting head is detachably mounted on the end of said elongated drive shaft.

10. The combination of claim 9 further comprising power means detachably connected to the end of said elongated drive shaft for rotating said shaft.

11. The combination of claim 5 wherein said brush is detachably mounted within said cutter.

12. A sprinkler head cleaning and trimming device comprising:
an elongated drive shaft;
a generally cylindrical cup shaped cutting head having a generally flat circular base connected to the end of a hollow shaft and generally cylindrical axially extending side walls having a generally circular cutting edge formed thereon, said cutting head being detachably connected to the end of said elongated drive shaft; and
a generally circular wire bristle brush having a generally disk like head mounted on the end of a shaft detachably mounted within said hollow shaft and a plurality of axially extending wire bristles extending outward from said circular disk.

* * * * *